United States Patent
Dreyer et al.

(10) Patent No.: US 10,556,984 B2
(45) Date of Patent: Feb. 11, 2020

(54) CHEMICALLY DECOMPOSABLE EPOXIDE RESIN SYSTEM

(71) Applicant: Fraunhofer-Gesellschaft zur Förderung der angewandten Forschung e. V., Munich (DE)

(72) Inventors: Christian Dreyer, Niederwörresbach (DE); Monika Bauer, Königs Wusterhausen (DE); Dominik Söthje, Berlin (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 0 days.

(21) Appl. No.: 16/275,016

(22) Filed: Feb. 13, 2019

(65) Prior Publication Data

US 2019/0177471 A1    Jun. 13, 2019

Related U.S. Application Data

(63) Continuation of application No. 15/117,129, filed as application No. PCT/EP2015/050096 on Jan. 6, 2015, now abandoned.

(30) Foreign Application Priority Data

Feb. 5, 2014    (DE) .................. 10 2014 101 413

(51) Int. Cl.
| | |
|---|---|
| *C08G 59/40* | (2006.01) |
| *B32B 27/04* | (2006.01) |
| *B32B 27/26* | (2006.01) |
| *B32B 27/38* | (2006.01) |
| *C08K 7/06* | (2006.01) |
| *C08K 7/14* | (2006.01) |
| *C08J 5/24* | (2006.01) |

(52) U.S. Cl.
CPC ............ *C08G 59/4014* (2013.01); *C08K 7/06* (2013.01); *C08K 7/14* (2013.01); *C08J 5/24* (2013.01)

(58) Field of Classification Search
None
See application file for complete search history.

(56) References Cited

U.S. PATENT DOCUMENTS

| | | |
|---|---|---|
| 5,132,778 A | 7/1992 | Juskey et al. |
| 5,539,012 A | 7/1996 | Klemarczyk et al. |
| 5,691,388 A | 11/1997 | Bauer et al. |
| 5,762,812 A | 6/1998 | Narang |
| 2010/0218982 A1 | 9/2010 | Fujiwara et al. |
| 2011/0017498 A1 | 1/2011 | Lauffer et al. |
| 2018/0355142 A1* | 12/2018 | Zhang ............ C08J 11/26 |
| 2019/0001532 A1* | 1/2019 | Guha ............ B29B 17/02 |

FOREIGN PATENT DOCUMENTS

| | | |
|---|---|---|
| DE | 4432965 C1 | 1/1996 |
| DE | 19839083 C2 | 2/2001 |
| EP | 1085044 B1 | 11/2005 |
| EP | 1550678 B1 | 3/2008 |
| EP | 2055728 B1 | 8/2010 |
| WO | WO 96/16112 A1 | 5/1996 |
| WO | WO 2012/071896 A1 | 6/2012 |

OTHER PUBLICATIONS

Kuang et al. "Dissolution of epoxy thermosets via mild alcoholysis: the mechanism and kinetics study"; RSC Adv., 2018, 8, 1493. (Year: 2018).*
Bauer et al.; "Aspects of the Kinetics, Modelling and Simulation of Network Build-Up during Cyanate Ester Cure;" Chemistry and Technology of Cyanate Ester Resins; (1994); pp. 58-86; <doi: 10.1007/978-94-011-1326-7_3 >.
Dang et al.; "An Approach to Chemical Recycling of Epoxy Resin Cured with Amine using Nitric Acid;" Polymer; (2002); pp. 2953-2958; vol. 43.
Dang et al.; "Chemical Recycling of Glass Fiber Reinforced Epoxy Resin Cured with Amine using Nitric Acid;" Polymer; (2005); pp. 1905-1912; vol. 46; <doi: 10.1016/j.polymer.2004.12.035 >.
Martin et al.; "Cure Chemo-Rheology of Mixtures Based on Epoxy Resins and Ester Cyanates;" European Polymer Journal; (Jan. 1999); pp. 57-68; vol. 35, Issue 1; <doi: 10.1016/S0014-3057(98)00095-0 >.
Penggang et al.; "Epoxy-Modified Cyanate Ester Resin and its High-Modulus Carbon-Fiber Composites;" Polymer Composites; (Jun. 23, 2006); pp. 402-409; vol. 27, Issue 4; <doi: 10.1002/pc.20207 >.
Pham et al.; "Epoxy Resins;" Encyclopedia of Polymer Science and Technology; (2004); 127 pages; <doi: 10.1002/0471440264.pst119 >.
Walters et al.; "Fire-Resistant Cyanate Ester-Epoxy Blends;" Fire and Materials; (2003); pp. 183-194; Fire Mater, vol. 27; <doi: 10.1002/fam.827 >.
Wang et al.; "Mechanical and Dielectric Properties of Epoxy/Dicyclopentadiene Bisphenol Cyanate Ester/Glass Fabric Composites;" eXPRESS Polymer Letters; (2008); pp. 118-125; vol. 2, No. 2; <doi: 10.3144/expresspolymlett.2008.16 >.

* cited by examiner

Primary Examiner — Michael J Feely
(74) Attorney, Agent, or Firm — Thorpe North & Western, LLP

(57) ABSTRACT

The invention relates to a chemically degradable cured epoxy resin system containing one or more epoxide resins and one or more curing agents, characterized in that the curing agent contains at least one cyanate, with which the epoxy resin reacts to form an epoxy resin polymer containing cyanurates. The cured epoxy resin system can be recycled by chemically decomposing the cured component epoxy resin system by aminolysis with reactive $NH_2$— or other amino groups and/or alcoholysis with mono-, di-, or poly functional alcohols.

13 Claims, 2 Drawing Sheets

CHEMICALLY DECOMPOSABLE EPOXIDE RESIN SYSTEM

RELATED APPLICATIONS

This is a continuation of application Ser. No. 15/117,129, having a filing date of Aug. 16, 2016, entitled Chemically Decomposable Epoxide Resin System, now abandoned, which is a US Nationalization of Patent Cooperation Treaty application Serial No. PCT/EP2015/050096, filed Jan. 6, 2015, entitled Chemically Degradable Epoxy Resin System, both incorporated herein by reference.

TECHNICAL FIELD

The invention relates to a chemically decomposable cured epoxide resin system comprising one or more epoxide resins and one or more curing agents. Epoxide resins, i.e. di- or poly functional mono- or oligomers with epoxide groups can be cured with various, typically aminic or anhydridic, curing agents to cure to duromer plastic materials. Examples for suitable di- or poly functional mono- or oligomers are glycidyl ethers and glycidyl amines.

PRIOR ART

The properties and uses of epoxide resins are described in great detail in Pham et al. "Epoxy Resins", Encyclopedia of Polymer Science and Technology, Bd. 9, S. 678-804 (John Wiley & Sons, Inc. 2004).

The following publications disclose cyanate containing epoxide resin systems:
- J. H. Wang "Mechanical and dielectric properties of epoxy/dicyclopentadiene bisphenol cyanate ester/glas fabric composites" in Express Polymer Letters, Bd. 2, Nr. 2(2008), S. 118-125,
- M. D. Martin et al. "Cure chemo-rheology of mixtures based on epoxy resins and ester cyanates" in European Polymer Journal 35 (1999) S. 57-68
- Pengang Ren et al. "Epoxy-Modified Cyanate Ester Resin and Its High-Modulus Carbon-Fiber Composites" in Polymer Composites Bd. 27 Nr. 4 (2006) S. 402-409
- R. N. Walters et al. "Fire-resistant cyanate ester-epoxy blends" in Fire and Materials Bd. 27 Nr. 4 (2003) S. 183-194
- JP 2011 256300 (Ajinmoto KK)

The recycling of cured epoxide resin systems is difficult due to its cross-linked structure. This applies, in particular, to chemical recycling under "mild" conditions. Considering the three-dimensional network such plastic materials cannot be melted or dissolved. Therefore, recycling by melting or dissolving analoguous to thermoplastics is not possible.

There are special epoxide resin systems which are decomposable. Decomposition is possible only with compositions where compromises regarding properties of the material are made, in particular a low glass transition temperature $T_g$. A known method is described, for example, in WO 2012/071896. One of the resin systems described therein is sold by Connoratech under the trademark "Recyclamine".

From publications W. Dang, M. Kubouchi, H. Sembokuya, K. Tsuda, Polymer, Vol 46. No. 6, pp. 1905-1912, February 2005 and W. Dang, M. Kubouchi, S. Yamamoto, H. Sembokuya, K. Tsuda, Polymer, Vol 43. No. 10, pp. 2953-2958, May 2002 decomposing methods are known having processing durations of up to 400 hours. They are not economic due to the long durations. Furthermore, aggressive or corrosive chemicals are necessary with such methods. The regeneration of the decomposition products generated during the decomposition is expensive.

A method for recycling printed circuit boards with epoxide resins as a matrix resin is described in WO96/16112.

A further method for recycling duromers, preferably duromers on the basis of epoxide resins, is known from DE 198 39 083 C2. High processing temperatures are necessary therein.

EP 1 085 044 B1 discloses the possibility to recycle anhydridically cured epoxide resins by aminolysis. The anhydridically cured epoxide resins have great disadvantages regarding storage stability of the uncured resin-curing agent-mixture. For this reason they cannot be used for the production of storable prepreg-type materials. The main portion of the prepreg-type materials must be storable, since they are not further processed immediately after their production.

There are polymer materials where the decomposition of the desired decomposition results can be economically achieved. An example for such a material is described in DE 44 32 965 C1. The polymer used there is a polycyanurate polymer and is decomposed by beginning with fine grinding and carrying out aminolysis with an agent comprising at least one reactive $NH_2$-group. The material may be suspended in a solvent. The production and the properties of such Polycyanurate polymers was described in great detail in M. Bauer, J. Bauer: Aspects of the kinetics, modelling and simulation of network build-up during cyanate ester cure in: I. Hamerton (ed.): Chemistry and Technology of Cyanate Ester Resins, London: Blackie Academic 1994, ISBN: 0-7514-0044-0.

DISCLOSURE OF THE INVENTION

It is an object of the invention to provide an epoxide resin system of the above mentioned kind which is economically decomposable without having to accept the impairing of the properties of the cured epoxide resin systems.

According to the invention this object is achieved in that the curing agent comprises at least one cyanate, which reacts with the epoxide resin to become an epoxide resin polymer comprising cyanurates. A cyanate is each material with the formula R—O—C≡N, wherein R is an organic residue, which is aromatic, partial halogenated- or perhalogenated-aliphatic. R may also comprise further functional groups, which are suitable as a curing group for epoxide resins. Such a further functional group is, for example, an OH-group or a further cyanate group. Upon polymerisation cyanurates are generated by cyclotrimerisation of the cyanate groups the cyanurates being characterized by the following structure element:

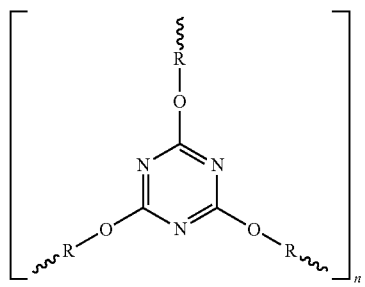

The reactions of epoxides with polycyanurates and the cross-linking structures resulting therefrom were described in great detail in M. Bauer, J. Bauer: Aspects of the kinetics, modelling and simulation of network build-up during cyanate ester cure in: I. Hamerton (ed.): Chemistry and Technology of Cyanate Ester Resins, London: Blackie Academic 1994, ISBN: 0-7514-0044-0.

Surprisingly, it was found that the addition of cyanates to the epoxide resin as a curing agent will lead to a very well decomposable material with excellent material properties. The addition of further curing agents is possible, but not necessary. The addition enables the generated epoxide resin polymer to be decomposed by the method described in DE 44 32 965 C1 and to recycle it economically. The cured epoxide resin product is finely ground after reaching the end of its life time. The powder or the mixture of epoxide resin polymer and solvent is then exposed to an aminolysis by adding an agent with at least one reactive $NH_2$-group.

Alternatively, larger components with or without enforcing fibers can be decomposed even without any shredding. In addition to requiring less efforts this has the advantage that the enforcing fibers can be recycled with greater length. The longer a fiber is the better its enforcing properties will be and the higher is achievable price.

Suitable solvents are cyclic ethers, such as THF, chlorinated carbohydrates, such as methylene chloride, or nitrogen containing solvents, such as pyrrolidone or NMP. Any amino group is suitable as reactive $NH_2$— or amino group which is able to initiate an aminolysis reaction. They are, in particular, ammonia, hydrazine, primary amines and primary hydrazines with aliphatic or aromatic residues, which at their end may also be substituted. The branching or chain length does not have an impact as long as the amino function has a sufficient reactivity towards the cyanurate groups. With such a method decomposition products are obtained which are more useful than common epoxide resin systems known in the prior art. It is, of course, also possible to carry out the decomposition without grinding or suspension in a solvent. Furthermore, different decomposing methods are possible which can be also applied to polycyanurate containing epoxide systems, such as alcoholysis with mono-, die- or poly functional alcohols.

Examples for suitable cyanates are compounds having the formulas II to VI, where the bivalent residue connecting the cyanate groups corresponds to the residue in formula I:

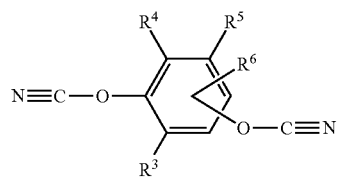

II

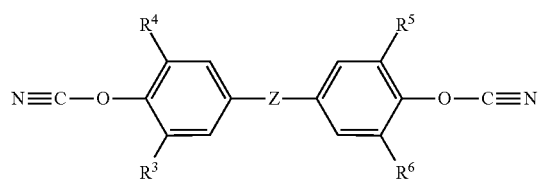

III

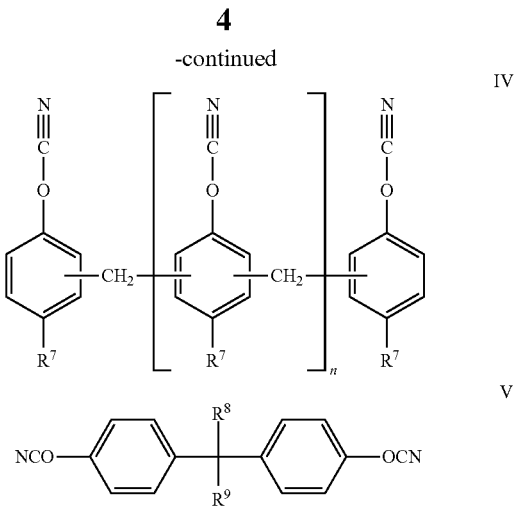

IV

V

V a) for $R^8$=H and $R^9$=$CH_3$ the corresponding cyanate is designated as 1,1'-bis(4-cyanatophenyle)ethane, which is commercially available under the trademark PRIMASET™ LECY by LONZA AG.

V a) for $R^8$=$CH_3$ and $R^9$=$CH_3$ the corresponding cyanate is designated as 2,2'-Bis(4-cyanatophenyl)propylidene, which is commercially available under the trademark PRIMASET™ BADCY by LONZA AG.

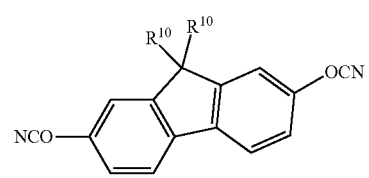

VI

Wherein $R^3$ to $R^6$ are independently from each other H, $C_1$-$C_{10}$-alkyl, $C_3$-$C_8$-cycloalkyl, $C_1$-$C_{10}$-alkoxy, halogen or phenyl, wherein the alkyl- or arylgroups may be fluorinated or partially fluorinated; Z is a chemical compound, $SO_2$, $CF_2$, $CH_2$, $CH(CH_3)$, isopropyl, hexafluoroisopropyl, alkyl, O, $NR^7$, N=N, CH=CH, CO—O, CH=N, CH=N—N=CH, alkyl-O-alkyl with $C_1$-$C_8$-alkyl, dicyclopentadienyl, S, $C(CH_3)_2$ or $C(CH_3)_2$-phenyl-$C(CH_3)_2$, and $R^7$ is H, $C_1$-$C_{10}$-alkyl, preferably $C_1$-$C_5$-alkyl; $R^8$ and $R^9$ each are independent from each other H, unsubstituted or with —OCN substituted aryl, in particular unsubstituted or with —OCN substituted phenyl, unsubstituted or substituted, in particular fluorinated or partially fluorinated alkyl, preferably $C_1$-$C_5$-alkyl and particularly preferred $CH_3$ or $F_3$; $R^{10}$ may be unsubstituted or with OCN substituted aryl, in particular unsubstituted or with —OCN substituted phenyl, unsubstituted or substituted, in particular fluorinated or partially fluorinated alkyl, preferably $C_1$-$C_5$-alkyl and particularly preferred may be $CH_3$ or $CF_3$ and n is 0 to 20.

A further group can be, for example, obtained from compounds having the formula VII to IX:

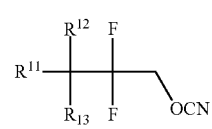

VII

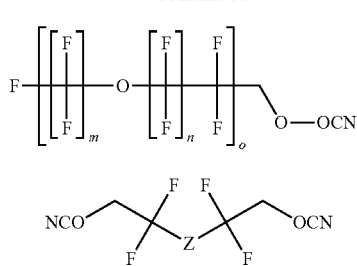

VIII

IX wherein $R^{11}$ to $R^{13}$ are alkylen-groups with 1, 2 or more carbon atoms, which are partially or entirely fluorinated. Examples are —$CH_3$, —$CH_2$—$CH_3$, —$CH$=$CH_2$, —$CHF$—$CF_3$ or —$C(R)_2$—$R'''$—$C(R')_3$, wherein the residues R' may be the same or different and may be a hydrogen- or fluorine atom and be a further optionally substituted and preferably fluorinated alkyl- or alkenyl group with preferably 1 to 6, more preferably 2 to 4 carbon atoms and the residue R" is a non-aromatic carbohydrate group containing at least one double bond, preferably an alkylene group with 2 to 12 carbon atoms. The indices m, n and o in formula VIII are independent from each other and are preferably between 0 and 12; while in formula IX Z may be, for example, a chemical group which is selected from $SO_2$, $CF_2$, $CH_2$, CHF, $CH(CH_3)_2$, isopropylene, hexafluoroisopropylene, fluorinated or partially fluorinated n- or iso-$C_1$-$C_{18}$-alkylene groups, O, $NR^{14}$, N=N, CH=CH, —(C=O)—O—, CH=N, —C=C—, alkyl-O-alkyl with 1 to 18 carbon atoms which are optionally partial or entirely fluorinated, S, $Si(CH_3)_2$, $Si(CH)_2$—[O—$Si(CH_3)_2]_p$ wherein p is between 1 and 12, or

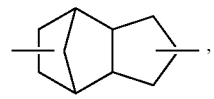

wherein $R^{14}$ is a hydrogen or a $C_1$-$C_{18}$ alkyl.

It is understood, that different cyanates with similar properties may also be used which react to be polycyanurates.

Preferably, the cyanate content is at least 30% of the functional groups in the copolymer, preferably 50% of the functional groups in the copolymer and most preferably 70% of the functional groups in the copolymer. A higher portion of the polycyanurates simplifies the decomposition in the above described method. It has been shown, however, that there is a relatively sharp limit for the portion where the decomposition is still economic and can be chemically well operated. Such limit depends, amongst others, from the selection of the used materials in order to ensure the required usage properties of the cured resin which shall be recycled.

The epoxide resins are formed preferably from aromatic epoxide resins. The aromatic epoxide resins are formed either of phenols, such as glycidether or of amines, such as, for example, glycidamines. It is, however, also possible to use aliphatic epoxide resins or mixtures thereof.

In a preferred embodiment of the invention it is provided that aromatic cyanates are used. Compared to partially halogenated or perhalogenated aliphatic cyanates they are well available and less expensive.

In addition to epoxide resin and cyanates further additives can be comprised in the system. Further additives may be, for example, mono-, die- and higher functional phenols or impact modificators, the latter also being called tougheners. An example for a difunctional phenol is Bisphenol A. The property profile of the resulting polymer can be adapted by such additives.

In a further modification of the invention Bisphenol A is provided as an additional copolymerizing component. The further component can be provided with at least 5 mass-%, preferably with at least 10 mass-%.

Fiber enforced plastics, mainly cross-linked plastics are used in a great number of applications. Examples are aeroplanes, rail vehicle construction, wind energy plants and in the most recent past automotive industry.

The epoxide resin systems according to the present invention may also be used as matrix resins for fiber reinforced plastics. Glass fibers and carbon fibers may be considered as reinforcing fibers. Obviously, different reinforcing fibers may also be used.

If cross-linked polymers are used as a matrix according to the prior art it is difficult to recycle the fiber-reinforced composites. The reinforcing fibers are much damaged by pyrolysis or mechanical processes.

The use of the epoxide resin systems according to the present invention as a matrix polymer provides the possibility to remove the resin matrix without considerable impact on the mechanical properties of the reinforcing fibers. The reinforcing fibers are not reduced in length by the described recycling method or only very little. This is advantageous for their further use as reinforcing fibers. The longer the reinforcing fibers are, the better are their mechanical properties with respect to the reinforcement and the higher is the achievable sales value thereof.

Modifications of the invention are subject matter of the subclaims. An embodiment is described below in greater detail with reference to the accompanying drawings.

DESCRIPTION OF THE EMBODIMENT

Figure 1:
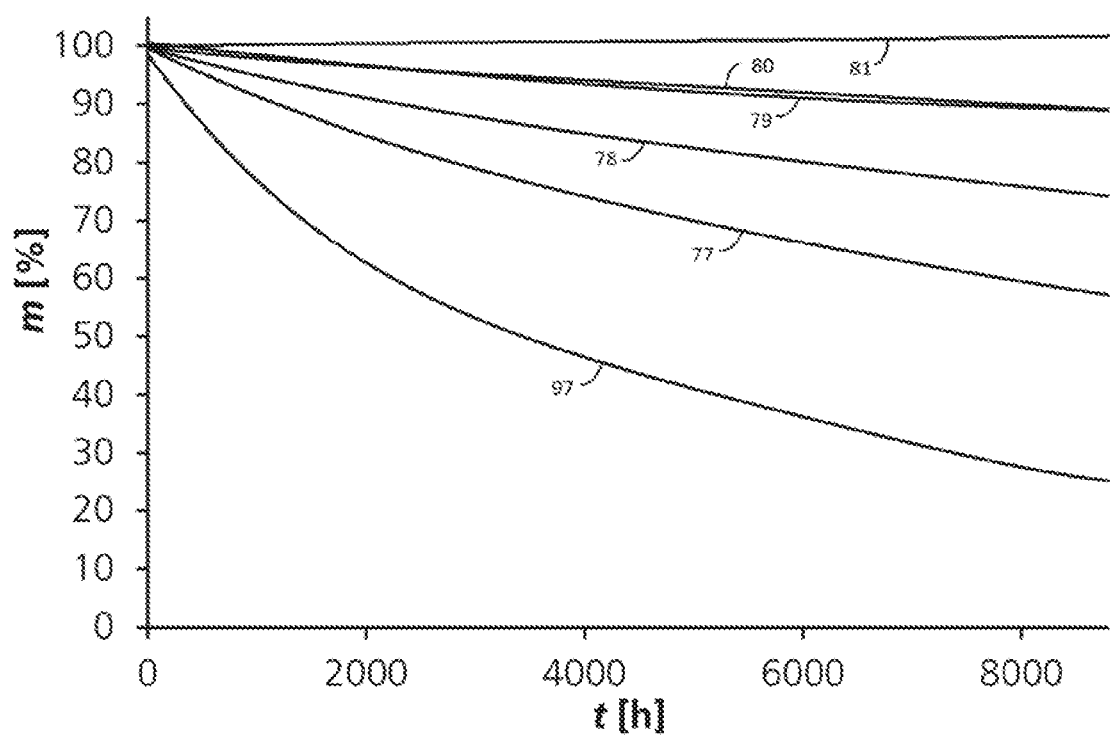
FIG. 1 shows the dependency of the sample mass on the decomposition duration for different samples at 20° C.

FIG. 1 shows the dependency of normed sample mass on the ordinate axis on the decomposition duration on the abscissa axis for different samples at 20° C. 2-aminoethanol was used as recycling agent. The homopolymer 1,1'-bis(4-cyanatophenyl)ethane, also called LECY, shown in formula V can be decomposed in a relatively short period of time. This is illustrated by the graph 97 in FIG. 1. The decomposition times increase with increasing DGEBF-content when LECY is used as a curing agent for the epoxide resin diglycidyl ether of Bisphenol F, also called DGEBF. The polymer 80 with 40 mass-% DGEBF shows a different decomposition behaviour than those with less or more epoxide resin: the sample body decomposed into several small pieces which prohibited an exact weighing. The polymer 77 has a DGEBF mass content of 10 mass-%, the polymer 78 a mass content of 20 mass-%, the polymer 79 a mass content of 30 mass-% and the polymer 81 a mass content of 50 mass-%. No significant decomposing could be found under such conditions during the experiment duration for polymer 81.

Figure 2:
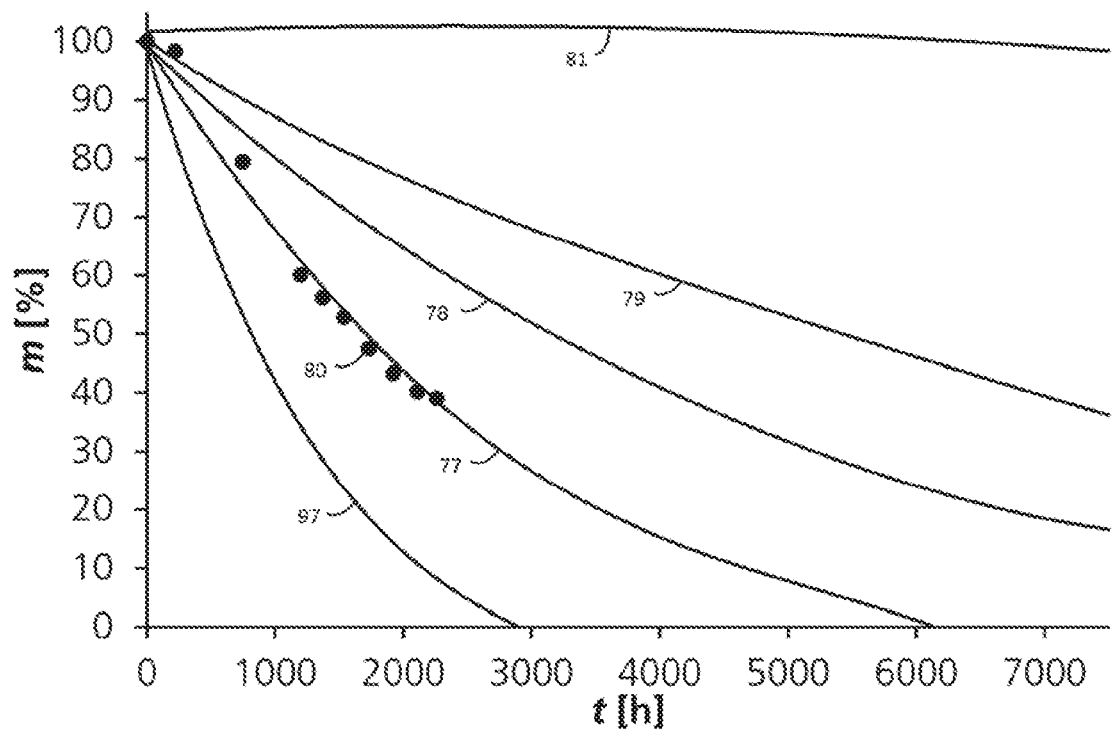
FIG. 2 shows the dependency of the sample mass on the decomposition duration for different samples at 40° C.

FIG. 2 shows the dependency of the sample mass on the decomposition duration up to the complete decomposition of polymers 97 and 77 at 40° C. The sample masses, normed to 100%, are represented by the ordinate while the corresponding decomposition durations are indicated on the abscissa in hours. 2-aminoethanol was used as a recycling agent. It can be recognized that the decomposition duration strongly increases if the polycyanurate content is below a threshold. The polymer 80 with 40 mass-% DGEBF shows a different decomposition behaviour than those with less epoxide resin: the sample body decomposed to a plurality of small pieces which prohibited exact weighing. Due to this circumstances only individual measuring values are present in FIG. 2 for the polymer 80. The polymer 77 has a DGEBF mass content of 10-%, the polymer 78 has a mass content of 20 mass-%, the polymer 79 has a mass content of 30 mass-%, and the polymer 81 has a mass content of 50 mass-%. Even with a reaction at 40° C. a sufficient decomposition could not be shown for the polymer 81.

Figure 3:
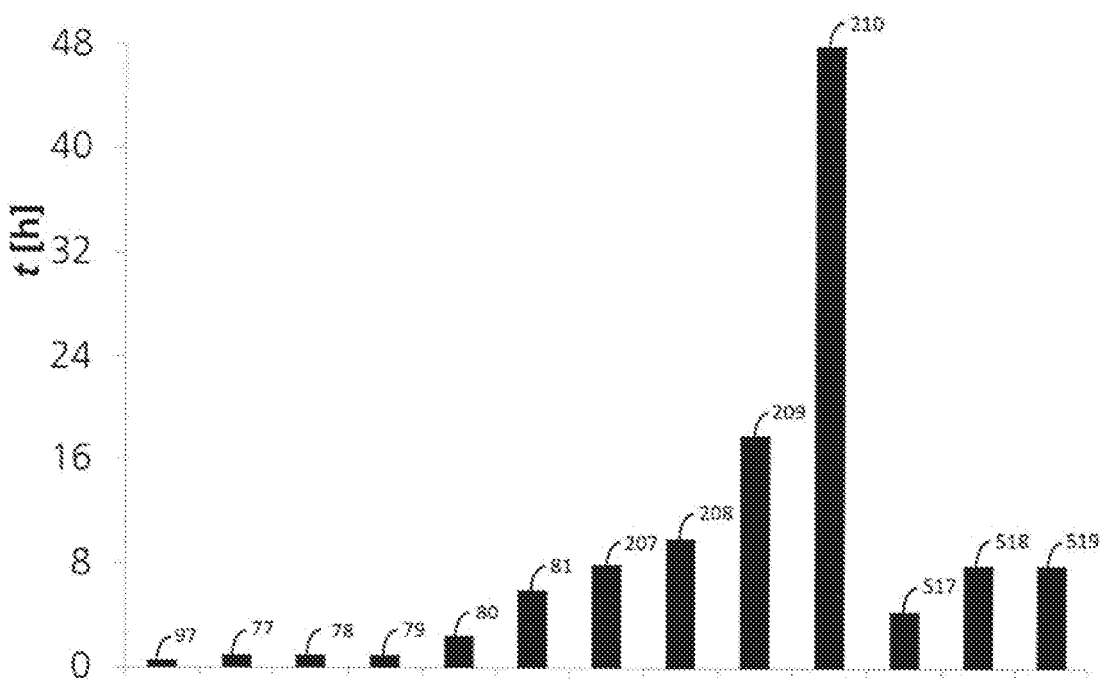
FIG. 3 shows the duration until complete decomposition for different samples in refluxing 2-aminoethanol.

FIG. 3 shows the decomposition time depending on the composition at the boiling point of the used recycling agent 2-aminoethanol. The bar 517 indicates the decomposition duration of a LECY cured DGEBF polymer with additional coreactants Bisphenol A, this polymer mixture can also be decomposed. The bar 518 indicates LECY cured epoxide resin with toughener CBTN X8 and the bar 519 indicates LECY cured epoxide resin with toughener WAX, such compositions are also decomposable. The decomposition of the polymer 210 with 58 mass % DGEBF lasts longer than 48 h. The duration until full decomposition increases with increasing epoxide content which is illustrated by the bars polymer 97 with 0 mass-% DGEBF to polymer 210 with 58 mass-%. The polymer 77 has a DGEBF-mass content of 10 mass-%, the polymer 78 has a mass content of 20 mass-%, the polymer 79 has a mass content of 30 mass-%, the polymer 80 has a mass content of 40 mass-% and the polymer 81 has a mass content of 50 mass-%. The polymers 207 to 210 have mass contents from 52 mass-% to 58 mass-%, increasing in steps of 2 mass-%.

Figure 4:
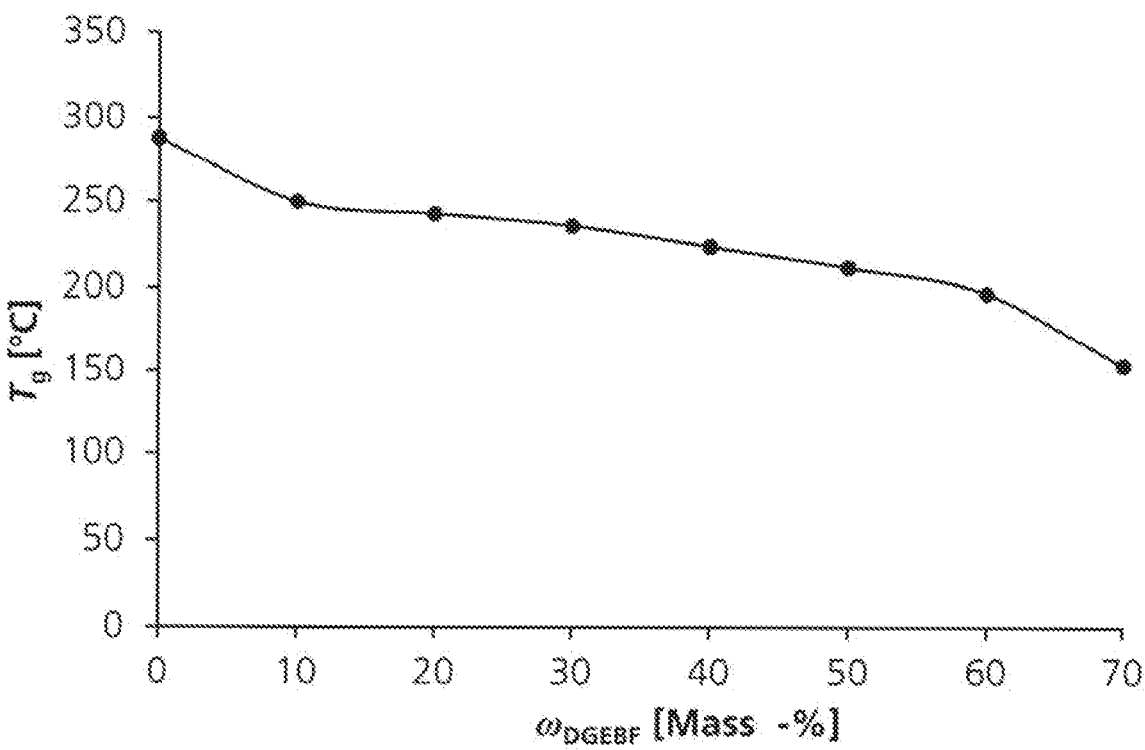
FIG. 4 shows the glass transition temperatures depending on the composition, the mass content of DGEBF, $\omega_{DGEBF}$ in %.

FIG. 4 shows the glass transition temperature depending on the mass content of epoxide resin EPIKOTE™ Resin, which is also called DGEBF. It can be seen also, that a strong decrease of the glass transition temperature occurs from an epoxide resin content of 60 mass-% on.

For investigating the recycling capability of epoxide resin polymers cured with cyanates pure resin plates were produced with various compositions. Commercially from Lonza available Primaset™ LECY was used as cyanate. Bisphenol-F-diglycidylether based epoxide resin EPIKOTE™ Resin 862 by Momentive was used as epoxide resin. Technical Bisphenol A was used as co-component.

Alumina moulds served to cast the pure resin plates. LECY was heated to about 40-50° C. in order to lower the viscosity and thereby ensure exact weighing. LECY was propounded in a beaker and the epoxide resin added. The mixture was homogenized by means of a magnetic stir bar or KPG stirrer. If additional impact modificator or Bisphenol A was added to the mixture a KPG stirrer was used at all times. Bisphenol A provided in the form of small balls was pulverized by means of a ball mill and added in small portions. The homogenized mixture was then poured into the alumina mould for curing and heated in a circulating air drying cabinet. A pure resin plate was made of pure LECY for reference.

The respective curing programs depending on the composition of the sampling plate are indicated in the following table:

| formula | LECY | EPIKOTE 862 + LECY (+Toughener) | EPIKOTE 862 + LECY + Bisphenol A |
|---|---|---|---|
| curing programme | 1. 120° C. 2. 2 h 180° C. heating 3. 30 h 180° C. 4. 0.5 h 250° C. heating 5. 4 h 250° C. | 1. 120° C. 2. 0.5 h 150° C. heating 3. 4 h 150° C. 4. 0.5 h 170° C. heating 5. 3 h 170° C. 6. 1 h 220° C. heating 7. 1 h 220° C. | 1. 120° C. 2. 0.5 h 150° C. heating 3. 4 h 150° C. 4. 0.5 h 170° C. heating 5. 3 h 170° C. |

Sampling plates were made for recycling experiments having a composition as indicated in the following table:

| plate number | $\omega_{L10}$ [mass-%] | $\omega_{DGEBF}$ [mass-%] | $\omega_{Bisphenol\ A}$ [mass-%] | $\omega_{CBTNX8}$ [mass-%] | $\omega_{WAX}$ [mass-%] |
|---|---|---|---|---|---|
| 97 | 100 | — | — | — | — |
| 77 | 90 | 10 | — | — | — |
| 78 | 80 | 20 | — | — | — |
| 79 | 70 | 30 | — | — | — |
| 80 | 60 | 40 | — | — | — |
| 81 | 50 | 50 | — | — | — |
| 82 | 40 | 60 | — | — | — |
| 83 | 30 | 70 | — | — | — |
| 207 | 48 | 52 | — | — | — |
| 208 | 46 | 54 | — | — | — |
| 209 | 44 | 56 | — | — | — |
| 210 | 42 | 58 | — | — | — |
| 517 | 40 | 40 | 20 | — | — |
| 518 | 45 | 45 | — | 10 | — |
| 519 | 45 | 45 | — | — | 10 |

The sample plates were sawn into pieces of 20×30×6 mm³ each having a mass of about 5 g. One sample of each of the polymers 77-83 was introduced in a duran screw cap glass with the 4-times amount of aminolysis reagent 2-aminoethanol and the glass was closed. One sample of each of the polymers was tempered at 20° C. and one sample of each of the polymers was tempered at 40° C. and the polymer samples taken after well-defined periods of time and weighed. This served to monitor the decomposition of the polymers.

Furthermore, the polymers 77-83, 207-210 and 517-519 were introduced in a 50 ml conical flask with Dimroth condenser and also the 4-times amount of 2-aminoethanol was added. With such experiments the 2-aminoethanol was heated in an oil bath to 172° C. whereby the experiments were carried out under reflux conditions. The time required for the full decomposition was recorded as the decomposition duration of the polymer sample.

The glass transition temperature (tan δ) was determined by means of torsion-dynamic mechanical analysis (DMA).

The invention claimed is:
1. Method for producing and recycling a cured epoxide resin system, comprising the steps of:
 (a) adding one or more epoxide resins and one or more curing agents wherein the one or more curing agents comprise at least one cyanate with the formula R—O—C≡N, wherein R is an organic residue which is aromatic, partially halogenated-aliphatic or perhalogenated-aliphatic;

(b) letting the mixture of epoxide resin and curing agent react to obtain a cyanurate comprising epoxide resin polymer; and
(c) using and recycling the epoxide resin system;
(d) wherein the content of the cyanate groups in the mixture of step (a) is at least 30% of the functional groups, and
(e) a chemical decomposition by aminolysis with reactive $NH_2$— or other amino groups and/or alcoholysis with mono-, di-, or poly functional alcohols is carried out for recycling.

2. The method according to claim 1, wherein the content of the cyanate groups in the mixture of step (a) is at least 50% of the functional groups.

3. The method according to claim 1, wherein the content of the cyanate groups in the mixture of step (a) is at least 70% of the functional groups.

4. The method according to claim 1, wherein the one or more epoxide resins are aromatic epoxide resins.

5. The method according to claim 1, wherein the at least one cyanate is an aromatic cyanate resin.

6. The method according to claim 1, wherein the curable epoxide resin system further comprises additives, and the amount of the at least one cyanate is adapted to the amount of the additives under consideration of cross-linking density.

7. The method according to claim 1, wherein the one or more curing agents includes a Bisphenol A curing agent.

8. The method according to claim 7, wherein the Bisphenol A curing agent is present in an amount of at least 5 mass-%, based on the overall curable epoxide resin system.

9. The method according to claim 1, wherein the cured epoxide resin system further comprising reinforcing fibers.

10. The method according to claim 9, wherein the reinforcing fibers are glass fibers and/or carbon fibers.

11. A method of constructing reinforced plastic components for use in aeroplanes, in rail vehicle construction, in wind energy plants, and in the automotive industry, comprising the steps of:
(a) forming a cured component of a curable epoxide resin system; and
(b) using such cured component and when finished using such cured component, recycling the epoxide resin system forming the cured component by chemically decomposing the cured component by aminolysis with reactive $NH_2$— or other amino groups and/or alcoholysis with mono-, di-, or poly functional alcohols,
wherein the curable epoxide resin system forming the cured component comprises one or more epoxide resins and one or more curing agents; wherein the one or more curing agents comprise at least one cyanate with the formula R—O—C≡N, wherein R is an organic residue which is aromatic, partially halogenated-aliphatic or perhalogenated-aliphatic; wherein the at least one cyanate is present in amount such that cyanate groups constitute at least 30% of reactive functional groups present in the curable epoxide resin system; and wherein the cured product comprises an epoxide resin polymer and cyanurates.

12. The method according to claim 11, wherein reinforcing fibers are included in the curable epoxide resin system whereby the cured components are fiber reinforced.

13. The method according to claim 12, wherein the reinforcing fibers are glass fibers and/or carbon fibers.

* * * * *